A. D. THEOBALD.
CULINARY HEATER.
APPLICATION FILED OCT. 2, 1919.
1,372,375.
Patented Mar. 22, 1921.
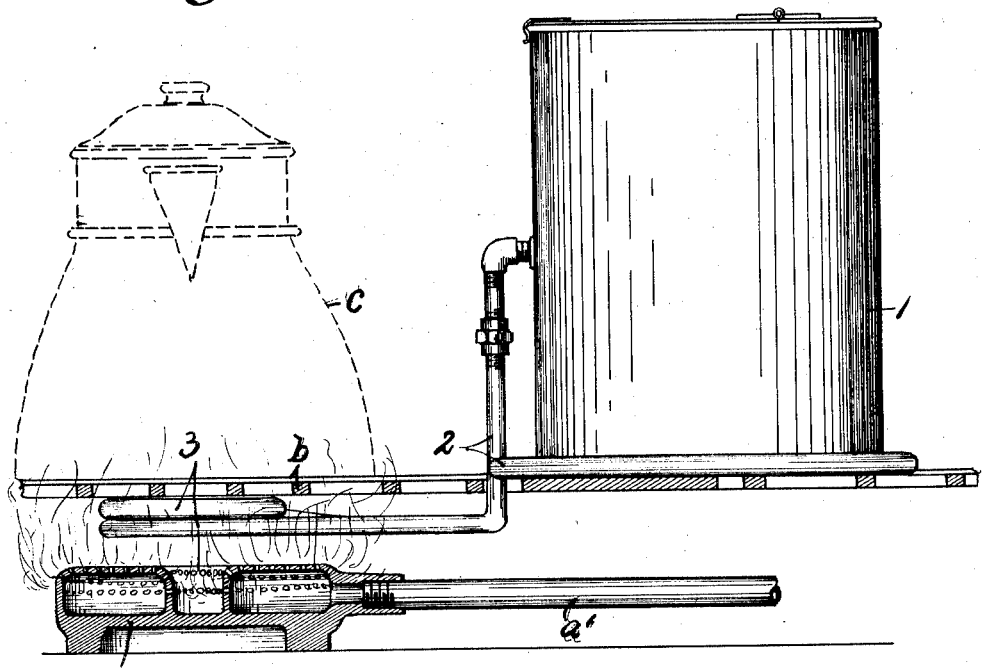
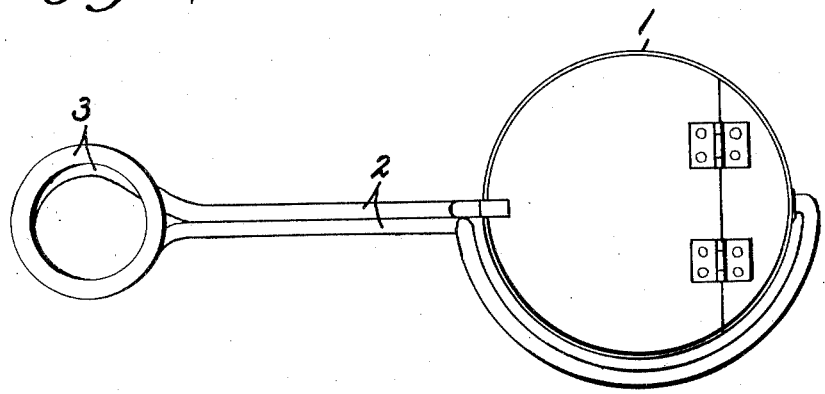
Inventor
A. D. Theobald
By Howard P. Denison
Attorney.

UNITED STATES PATENT OFFICE.

ADELBERT D. THEOBALD, OF CUYLER, NEW YORK.

CULINARY HEATER.

1,372,375. Specification of Letters Patent. Patented Mar. 22, 1921.

Application filed October 2, 1919. Serial No. 327,946.

*To all whom it may concern:*

Be it known that I, ADELBERT D. THEOBALD, of Cuyler, in the county of Cortland, in the State of New York, have invented new and useful Improvements in Culinary Heaters, of which the following, taken in connection with the accompanying drawings, is a full, clear, and exact description.

This invention relates to certain improvements in culinary heaters in which gas or oil burners are commonly used as a source of heat.

In gas and oil ranges now in common use each burner is permanently associated with a superposed grid or grill plate upon which the cooking utensil or other article containing the matter to be heated is supported directly over the flame, so that when it is desired to heat the contents of two or more containers it is necessary to place each upon the grid over a separate burner, and the main object of my present invention is to provide simple and efficient means whereby the contents of one or more additional receptacles other than that which rests upon the particular burner may be heated from the same burner simultaneously with the contents of the container which rests on the grid.

In other words, I have sought to heat the contents of two or more containers from the same burner commonly used in gas and oil stoves without in any way altering the construction of said stoves. Other objects and uses relating to certain parts of my invention will be brought out in the following description.

In the drawings:

Figure 1 is a side elevation partly in section of portions of an ordinary gas stove with my invention in operative position for heating the contents of two receptacles by the same burner.

Fig. 2 is a top plan of one of these receptacles and its means of conducting heat from the burner thereto.

The device which forms the subject matter of my invention is adapted to be used in connection with any of the standard types of gas or oil stoves commonly used for culinary gas or oil stoves commonly used for culinary purposes, having one or more of the usual gas or oil burners "$a$" and a superposed grid or grids "$b$," one for each burner, said grid or grids being usually spaced a greater or less distance apart from the burner "$a$" in a substantially horizontal plane for receiving and supporting a cooking utensil or other container "$c$," the contents of which are to be heated, the burner "$a$" being supplied with gas or oil from any available source through the pipe "$a'$."

This device comprises an upright container —1— to which are connected at different levels the ends of an external pipe —2— having a portion thereof coiled at —3— about a vertical axis parallel with the axis of and some distance from the container —1—.

This coil —3— is disposed in a substantially horizontal plane below that of the bottom of the container —1— so that the distance from its vertical axis to that of the container is considerably greater than the diameter of the surface area of the grid which overlies the burner or any ordinary receptacle which may be mounted thereon, which enables the coil to be inserted between the burner and grid with its axis substantially coincident with that of the burner while the container —1— may be supported upon the surface of the stove or other available support some distance to one side of that which rests upon the grid, whereby the heat from the burner may serve the double purpose of heating the contents of the container —1— and at the same time heat the liquid in the coil —3— and cause it to circulate through the pipe to and from the container —1— for heating the liquid in the last named container and thereby greatly economizing in the use of fuel and also expediting the culinary work.

The container —1— with its pipe —2— and coil —3— constitutes a unitary article of manufacture capable of being easily and quickly placed in operative position as previously described without in any way altering any parts of the stove or interfering with the use of the burner in the usual manner for heating the contents of containers as "$c$" which may be placed upon the grid "$b$" or removed therefrom at will without disturbing the position of the container —1— or its pipe —2— and coil —3—.

The grids "$b$" are usually removable which enables the container —1— with its pipe —2— and coil —3— to be easily and quickly placed in position for heating the contents of the container —1— by the same burner which heats the contents of the container "$c$," it being understood that after the container —1— and its pipe —2— are placed in operative position, the grid "$b$" is replaced for receiving and supporting any of the ordinary utensils commonly used for cooking and heating purposes.

It will be noted that the portions of the circulating pipes —2— between the cylindrical tank —1— and coil —3— are brought close together in substantially the same horizontal plane to enable them to transmit their heat from one portion to the other and also to pass through a relatively small opening in the grid, and that the outer end of the return-flow pipe is substantially semicircular and embraces the lower end of the tank —1— in close proximity thereto so as to keep those parts in close compact relation and at the same time permitting them to transmit their heat from one to the other and still allow both the up-flow and return-flow portions to be connected to opposite sides of the tank and at different levels.

What I claim is:

In a water heater the combination with a burner and an openwork kettle-supporting grid overlying the burner in spaced relation thereto, of a cylindrical water tank supported in a plane above that of the grid and at one side thereof, a pipe coil disposed in a horizontal plane in the space between the burner and grid, an up-flow pipe leading from one end of the coil to one side of the tank some distance above the bottom thereof and the return-flow pipe leading from the opposite side of the tank near the bottom thereof to the other end of the coil, said return-flow pipe having a substantially semicircular portion thereof extending around one side of the periphery of the tank, portions of the up-flow and return pipes between the tank and coil being arranged side by side in close proximity to each other to impart heat from one to the other, the semicircular portion of the return-flow pipe fitting around the base of the tank and the juxtaposition of the portions of said pipes between the tank and coil serving also to economize in space whereby the tank and circulating pipes may be made as a compact unitary article of manufacture.

In witness whereof I have hereunto set my hand this 25th day of Sept. 1919.

ADELBERT D. THEOBALD.

Witnesses:
H. A. MUNCY,
B. F. CRAW.